United States Patent [19]

Ford

[11] Patent Number: 4,926,437
[45] Date of Patent: May 15, 1990

[54] CERAMIC CATHODE FOR RING LASERS

[76] Inventor: Carol M. Ford, 3942 Main St., NE., Columbia Heights, Minn. 55421

[21] Appl. No.: 287,773

[22] Filed: Dec. 21, 1988

[51] Int. Cl.⁵ .............................. H01S 3/097
[52] U.S. Cl. .......................... 372/87; 372/94
[58] Field of Search ............ 372/87, 94, 88, 86, 372/55

[56] References Cited

U.S. PATENT DOCUMENTS

| | | |
|---|---|---|
| 3,959,683 | 5/1976 | Kupsky . |
| 4,007,431 | 2/1977 | Abbink et al. . |
| 4,125,307 | 11/1978 | Thayer . |
| 4,595,377 | 6/1986 | Norvell . |
| 4,672,623 | 6/1987 | Mellum et al. ............... 372/87 |
| 4,677,638 | 6/1987 | Beaupere et al. . |
| 4,734,915 | 3/1988 | Meffold et al. ............... 372/62 |

*Primary Examiner*—Léon Scott, Jr.
*Attorney, Agent, or Firm*—Robert A. Pajak

[57] ABSTRACT

Disclosed is a ceramic cathode for a ring laser gyro comprising a ceramic substantially composed of a material selected from the group consisting of silicon carbide, boron carbide, and boron nitride.

6 Claims, 1 Drawing Sheet

CERAMIC CATHODE FOR RING LASERS

BACKGROUND OF THE INVENTION

The present invention relates generally to ring laser gyros, and more particularly to the cathode construction found in such devices.

A laser typically employs an unheated or cold cathode which is secured to a laser body or housing as a source of electron admission for laser operation. The body of the laser may be composed of glass or glass like materials, generally having low coefficients of thermal expansion. The cathode may be composed of a metal or metal-alloy material, for example aluminum, well known in the art. The cathode is generally secured to the laser body by a gas tight seal, and is adapted to be connected to a negative electric potential source.

In gas lasers having a limited gas supply, cathode sputtering is one of the major causes of shortened laser life. In a helium-neon gas laser, positive charged gas ions of the plasma are attracted to the negatively charged cathode, and release negatively charged electrons. Unfortunately, the positively charged ions can dislodge cathode material molecules from the active cathode emitting surface of the cathode. The phenomenon is usually referred to as cathode sputtering. For gas laser applications, cathode sputtering results in decreased laser life. As a result of cathode sputtering, the dislodged cathode material can, in turn, trap lasing gas molecules to the walls of the cathode and the walls of the laser cavity. If the supply of gas is limited, the reduction of available gas ions can cause the lasing acting to cease.

Metallic cathodes, particularly aluminum cathodes, have been widely used in the art for ring lasers. An aluminum cathode generally has the cathode emitting surface coated with a thin layer of oxide to prevent cathode sputtering. During the cathode manufacturing process, a layer of oxide is formed naturally by exposing a cleaned aluminum cathode emitting surface to an oxygen plasma with the aluminum cathode connected as the cathode in an electrical circuit. A thin layer of oxide is formed on the aluminum electron emitting surface due to the pressure of oxygen and oxygen ions hitting the cathode surface.

Aluminum cathodes having the oxide layer have improved laser life over uncoated aluminum due to increasing the resistance to sputtering. This is so since the oxide layer is generally harder than the aluminum. Nevertheless, irregularities in the emitting surface of the cathode can result in localized ion flow which in time breaks down the oxide layer, and begins localized sputtering of the cathode resulting in extinction of the laser.

Further, ring laser applications, it is desirable that the cathode have a very low thermal coefficient of expansion so that it can be secured to a laser body or block which has a very low coefficient of thermal expansion. Ring laser blocks are generally comprised of quartz like products such as Zerdor and Cervit which have a very low coefficient of thermal expansion. In these circumstances, it is highly desirable that the coefficient of thermal expansion of the cathode be as low as possible and preferably match the coefficient of thermal expansion of the laser body.

U.S. Pat. No. 4,595,377 issued to S. Norvell, et al. describes a cathode for a laser comprised of a vitreous carbon. Described in the above-referred to patent, vitreous carbon is produced by the thermal degradation of organic polymers in an oxygen free environment. The polymers may be molded or cast into predetermined shapes before thermal degradation. Vitreous carbon is highly cross-linked and has glassy properties. However, vitreous carbon can retain trace amounts of the polymers or resin which can affect laser life by out gassing contaminants.

SUMMARY OF THE INVENTION

It is an object of the present invention to provide a cathode for a ring laser which enhances laser life.

It is another object of the invention to provide a cathode having a very low coefficient of thermal expansion and is resistant to the deleterious effects of cathode sputtering caused by the lasing gas plasma within the active gas ring laser.

These and other objects of the invention are realized in accordance with the present invention in the employment of a cathode comprising a ceramic electrode made from a non-metallic powder comprised of materials selected from the group of silicon carbide, boron carbide, and boron nitride.

BRIEF DESCRIPTION OF THE INVENTION

Figure 1:
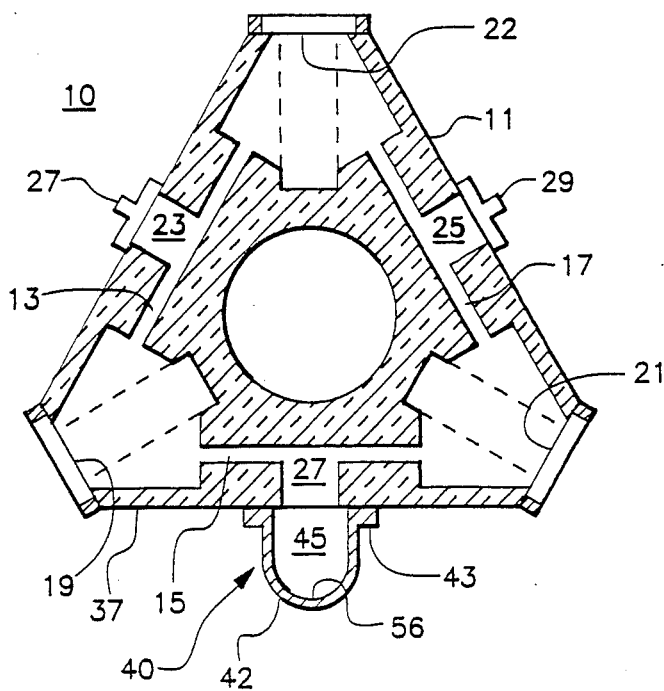
FIG. 1 is a schematic diagram of a ring laser.

FIG. 1 illustrates a cathode commonly used for a ring laser. The ring laser is generally comprised of a block 11 usually made Referring now to FIG. 1, there is disclosed a pictorial representation of a gas filled ring laser angular rate sensor 10 comprising a block 11 usually made of quartz, Cervit, Zerodur, ceramic, or the like. A plurality of three interconnected tunnels 12, 15 and 17 are bored within block 11 at angles to each other to form a triangular shaped cavity. Mirrors 19, 21 and 22 are mounted on block 11 at the intersection of each of the tunnels 13, 15 and 17, respectively. Each mirror functions to reflect light from one tunnel into the next thereby forming a closed-loop optical path.

A pair of anodes 27 and 29 are mounted on block 11 and adapted to communicate with laser tunnels 13 and 17 respectively, through interconnecting cavities 23 and 25, respectively. A quantity of lasing gas for plasma is adapted to be contained within the tunnels 13, 15 and 17. The gas may be inserted into the block cavities through one of the anode cavities used as a fill tube and one of the anodes which may also serve as a sealable port.

A cathode 40 is mounted on block 11 and in communication with the optical closed-loop cavity through interconnecting cavity 27. Cathode 40 is symmetrically located relative to anodes 27 and 29, and tunnels 13, 15, and 17. The symmetrical location of the pair of anodes and cathode is intended to reduce gas flow effects which can adversely affect the performance of the rate sensor as is well known.

In operation, with a sufficiently large potential applied between the cathode and the anodes, a first discharge current is emitted from cathode 40 out into tube 15 toward mirror 19 and through tube 13 to anode 27. A second discharge current flows from cathode 40 out into tube 15 toward mirror 21 and through tube 17 to anode 29. These two discharge currents are usually controlled in intensity. The discharge currents function to ionize the lasing gas and thereby provide a pair of counter-propagating laser beams within the closed-loop optical cavity in a well known manner.

Figure 2:
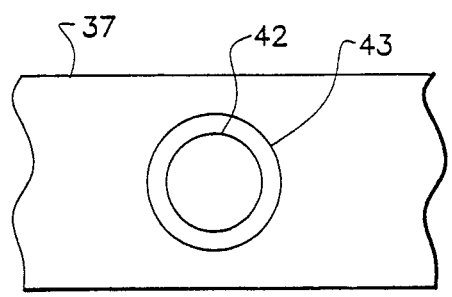
FIG. 2 is a top view of the cathode illustrated in FIG. 1.

As is generally illustrated in FIGS. 1 and 2, cathode 40 is comprised of a dome shaped body 42 having a cavity 45 with a cathode emitting surface 56. Cathode 40 may be fixed to laser block 11 by an indium seal (not shown), or by any other appropriate manner. Cathode 40 includes an annular mounting flange 43. Cathode 40 is constructed such that cavity 45 inwardly extends from mounting flange 43.

In the present invention, cathode 40 is comprised of a non-metallic ceramic material selected from the group consisting of silicon carbide, boron carbide and boron nitride. These materials may include more or less "dopant" materials to alter the resultant characteristics, thereof. Specifically, the electrical conductivity and durability of these materials can be controlled by dopant materials such as more or less amounts of the base material. For example silicon carbide including 4% to 7% free silicon provides excellent electrical conductivity and durability.

Other dopant materials, for example metallic elements and compounds, could also be used to provide a cathode having wide variety of electrical and mechanical characteristics. Specifically, secondary electron emission can be enhanced by the addition of metallic elements or compounds to the ceramic materials already described. Since secondary emission is the ratio of free electrons for each ion bombardment, enhancement of secondary electron emission enhances laser life. This is so since more free electrons are available with less ion bombardment of the cathode emitting surface. In the preferred embodiment of the present invention, small amounts of beryllium, platinum, manganese, and the like will enhance the secondary electron emission of ceramic cathodes composed of either silicon carbide, boron carbide, or boron nitride.

The ceramic cathode in accordance with the present invention is produced by the use of powders which are tightly compressed into a mold to fill all of the voids. Further, the temperature of the mold and powders is raised to a temperature preferably below the melting point to form a ceramic structure.

The ceramic electrode comprised of aforementioned pure powders of the chosen material or mixture, and produced by a high temperature and/or high pressure results in a dense center ceramic material. The manufacturing process can include dry pressing, semi-dry pressing, extruding, isostatic-isotropic pressing, or injection molding. The process, shape of the particles of the powder mixture, the original size of the particles, and characteristics of the elements of the powder mixture, all impact the characteristics of the ceramic electrode.

These aforementioned variables are chosen to produce a ceramic electrode comprised of either silicon carbide, boron carbide, or boron nitride mixture which exhibits high compression and mechanical strengths, good electrical conductivity, high temperature stability, chemically durability, wear resistance, vacuum tightness, and will not out gas, rust, or oxidize. For example, semi-dry pressing a 10-90 mixture of free silicon and silicon carbide provides excellent electrode characteristic useful for laser operation having cathode life much greater than those of prior art aluminum cathodes.

The ceramic cathode in accordance with the present invention is extremely hard and has excellent resistance to sputtering thereby enhancing laser life.

Preferably the ceramic cathode in accordance with the present invention has an electrical resistivity of several ohm-cm at 25° C. Electrical resistivity on this order may decrease plasma oscillations which are usually present within a laser cavity and therefore can enhance laser life.

The coefficient of thermal expansion of a ceramic cathode in accordance with the present invention is very low compared with most laser electrodes known in the prior art. For example, the coefficient of thermal expansion is $4.2 \times 10^{-6}/°C$. for silicon carbide and $5 \times 10^{-6}/°C$. for boron carbide. With these lower coefficients of thermal expansion, sealing between the ceramic electrode and low coefficient of thermal expansion laser bodies is improved.

The embodiments of an invention in which an exclusive property or right is claimed are defined as follows:

1. A laser generator comprising:
a body for containing a gas;
a electric potential source;
a electrode secured to said body and providing a gas tight seal, said electrode being adapted to be electrically connected to the negative side of said source; and
wherein said electrode is a monolithic body of a sintered powder of a ceramic material substantially composed of a material selected from the group consisting of boron carbide and boron nitride, and mixtures thereof.

2. A ring laser gyro comprising:
a substantially thermally and mechanically stable block having a plurality of interconnected gas containing tunnels forming an optical closed-loop path cavity therein;
at least one anode mounted on said block and in communication with said gas;
a cathode mounted on said block and in communication with said gas, and said cathode is a monolithic body of a sintered powder of a ceramic material substantially composed of a material selected from the group consisting of boron carbide and boron nitride and mixtures thereof.

3. The ceramic cathode of claim 2 wherein said ceramic material includes selected amounts of a metallic element for enhancement of secondary electron emission of said cathode.

4. The ceramic cathode of claim 3 wherein said metallic element is selected from the group consisting of beryllium, platinum, and manganese, and compounds thereof.

5. The ceramic electrode of claim 1 wherein said ceramic material includes selected amounts of a metallic element for enhancement of secondary electron emission of said cathode.

6. The ceramic electrode of claim 5 wherein said metallic element is selected from the group consisting of beryllium, platinum, and manganese, and compounds thereof.

* * * * *